United States Patent [19]

Bittner

[11] Patent Number: 5,402,699

[45] Date of Patent: Apr. 4, 1995

[54] BLADE GUIDE OF A GUILLOTINE SHEAR

[75] Inventor: Gerhard Bittner, Duisburg, Germany

[73] Assignee: Mannesmann Aktiengesellschaft, Dusseldorf, Germany

[21] Appl. No.: 129,443

[22] Filed: Sep. 30, 1993

[30] Foreign Application Priority Data

Sep. 30, 1992 [DE] Germany ............... 42 33 555.8

[51] Int. Cl.⁶ ............................................ B23D 25/04
[52] U.S. Cl. ........................................ 83/328; 83/320; 83/641
[58] Field of Search ............... 83/320, 328, 559, 561, 83/623, 641, 829

[56] References Cited

U.S. PATENT DOCUMENTS 4,027,564  6/1977  Yahara ................... 83/328
4,485,713 12/1984  Dotta .................. 83/328 X

FOREIGN PATENT DOCUMENTS 2429802  1/1976  Germany ............... 83/328

Primary Examiner—Richard K. Seidel
Assistant Examiner—Raymond D. Woods
Attorney, Agent, or Firm—Cohen, Pontani, Lieberman, Pavane

[57] ABSTRACT

A blade guide of a guillotine shear for flying transverse parting of strips, particularly steel strips. The shear having a shear housing in which blades fastened to blade supports are movable relative to one another on parallel guide paths for cutting and transversely to the guide paths in the running direction of the strip and at the running speed of the strip. The guide paths are arranged in a guide frame which is movable horizontally in the shear housing and the blade supports in the guide frame can be set in rotation by means of crank mechanisms which are supported in the shear housing and are associated with each blade support.

5 Claims, 2 Drawing Sheets

BLADE GUIDE OF A GUILLOTINE SHEAR

BACKGROUND OF THE INVENTION

1. Field of the Invention

The invention relates to the blade guide of a crank shear or guillotine shear for flying transverse parting of strips, particularly steel strips. The shear having a shear housing in which blades fastened to blade supports are movable relative to one another on parallel guide paths for cutting and transversely to the guide paths in the running direction of the strip and at the running speed of the strip.

2. Description of the Prior Art

For transverse severing of continuously moving strips, shears are used in which the blades move at the same speed as the strip to be cut when cutting in the running direction of the strip. Various systems such as drum shears, guillotine shears or pendulum shears are known. Each of these systems has its own advantages or disadvantages which will not be discussed at greater length here.

Guillotine shears of the generic type have two problems to be emphasized, namely the relatively large mass of the shears to be guided in and out of the cutting position and the adjustment of the blades and blade gaps relative to the strip to be cut.

A guillotine shear with a stationary upper blade is known from the German Offenlegungsschrift 26 55 962. The lower blade of this guillotine shear is movable toward the upper blade in parallel guide paths and the entire shear housing is in turn displaceable on a horizontal path in accordance with the running speed of the strip. The movable blade is driven by an adjustable crank mechanism and is brought into a cutting position on the continuously running strip corresponding to the desired cutting length.

In the known construction, tile heavy shear housing is moved independently of the drive of the movable blade, but it is very difficult to accelerate and brake the large masses, so that correspondingly dimensioned drives are required. An adjustment of the blades for severing strips of different thickness is not described in this previously known solution. However, from prior art it is known to one skilled in the art to adjust the guides of the blade support via wedges, which is complicated and difficult to do, since everything rotates in guillotine shears, particularly those with movable upper and lower blades. It is also known to displace the helical-geared drive gears axially on the crankshaft so as to produce rotation between the drive crankshafts. However, this is problematic in rapidly moved shears, particularly those working in start-stop operation, since the one-sided helical gearing causes high axial forces.

Finally, it is known to construct one of the blade supports so that it can be rotated in the cutting plane. This construction changes the parallel state of the blades, weakens the blade beam, and drastically increases the weight of the rotating mass.

SUMMARY OF THE INVENTION

The various features of novelty which characterize the invention are pointed out with particularity in the claims annexed to and forming a part of the disclosure. For a better understanding of the invention, its operating advantages, and specific object attained by its use, reference should be had to the drawing and descriptive matter in which there are illustrated and described preferred embodiments of the invention.

Accordingly, it is an object of tile present invention to provide an improved blade guide of a guillotine shear of the generic type, in which the disadvantages described above relating to tile movement of large masses do not occur and which enables a simple adjustment of the blade gap in a well thought-out construction and in which particularly good cuts can be made in that the blades remain parallel.

Pursuant to this object, and others which will become apparent hereafter, one aspect of the present invention resides in arranging the guide paths in a guide frame which is movable horizontally in the shear housing. The blade supports can be set in rotation in the guide frame by means of crank mechanisms which are supported in the shear housing and associated with every blade support.

In contrast to the prior art described above, the entire shear housing is no longer accelerated and braked, but rather only a relatively light guide frame within the stationary shear housing in which the parallel guide paths for the blade supports are provided. The drives for the blades themselves are provided in the stationary shear housing in which the crank mechanisms are also supported. These crank mechanisms cause the blade supports with the blades to be set in rotation, so that the blade supports with the blades are moved toward one another and away from one another in the guide frame and the guide frame itself is moved back and forth in the horizontal direction.

In order to effect a particularly simple adjustment of the blades to different strip thickness for the purpose of meeting the proposed object, in another embodiment of the invention the guide frame has an upper and a lower guide frame half which receive the upper and lower blade and are connected with one another in the direction of the guide paths so as to be displaceable transversely thereto. The gap between the blades can be adjusted by transverse displacement of the guide frame halves without having to change the kinematics of the shear in other respects.

Spindle drives or other linear drives can be provided for displacing the guide frame halves.

According to a further embodiment of the invention at least one guide frame half is guided at the shear housing so as to be supported on a horizontal path.

According to an additional embodiment of the invention, the guide frame is tiltable when the guide frame halves are displaced in opposite directions relative to one another, each guide frame half being swiveled around the crank center of rotation of the blade drive associated with it. The advantage of this embodiment is that the blades always remain parallel to one another and the adjusting mechanism is very simple and functional. An external motor-driven adjustment of the displacing drive is readily achievable so that the entire device can be automated.

With the present invention the disadvantages of the prior art described above with respect to the adjustment of the blades are eliminated. A blade guide of a guillotine shear having a simple construction and high operating speeds with small moved masses is simultaneously provided.

The various features of novelty which characterize the invention are pointed out with particularity in the claims annexed to and forming a part of the disclosure. For a better understanding of the invention, its operating advantages, and specific object attained by its use, reference should be had to the drawing and descriptive matter in which there are illustrated and described preferred embodiments of the invention.

DETAILED DESCRIPTION OF THE PREFERRED EMBODIMENTS

Figure 1:
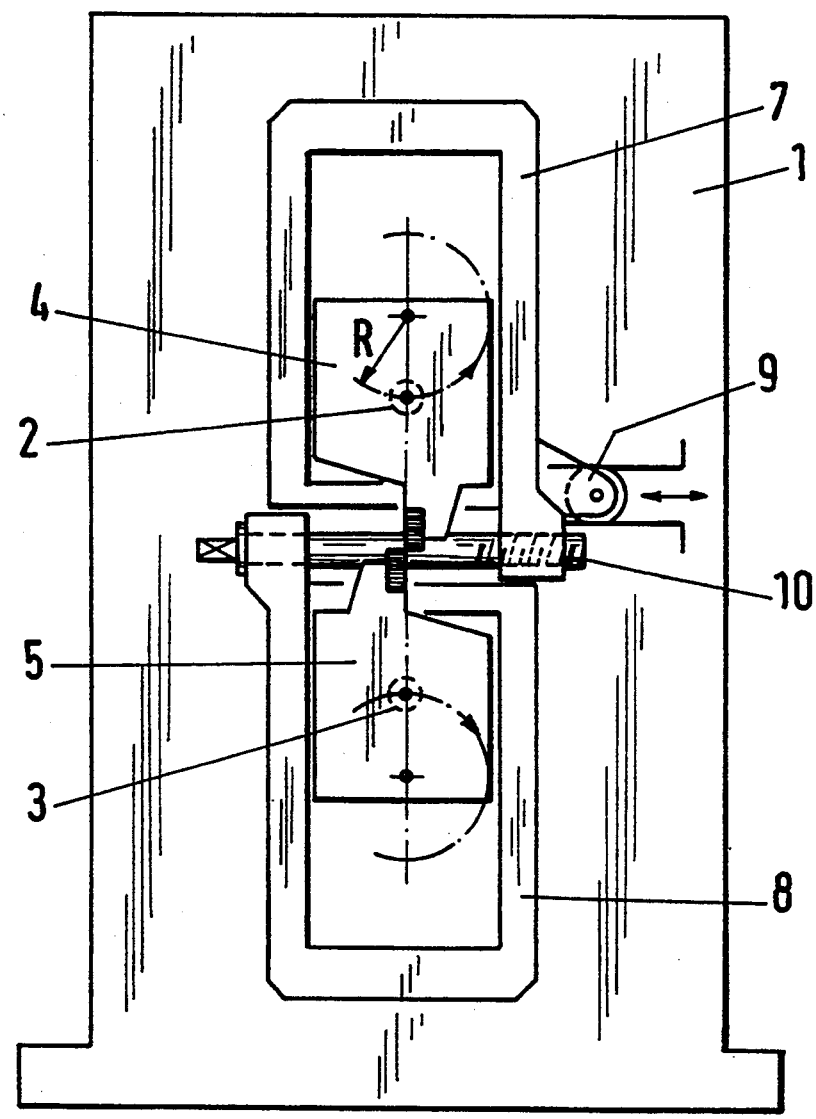
FIG. 1 is a greatly simplified view of a guillotine shear according to the invention.

The shear housing in which two crankshafts 2 and 3 are supported is designated by 1 in FIG. 1. The crank shafts 2 and 3 set the two blade supports 4 and 5 of the upper and lower blade in rotation. The blade supports 4 and 5 are guided in known parallel guide paths which in the present invention, however, are provided in a guide frame having guide frame halves 7 and 8. The guide frame halves 7 and 8 are connected with one another in the vertical direction in a manner not shown in the drawing, but can be displaced horizontally relative to one another via screw spindles 10. As shown schematically at 9, the guide frame can be moved back and forth in the horizontal direction, for which purpose the roller guide 9 corresponding to a rolling path arranged at the shear housing is provided at the tipper guide frame half 7 laterally adjacent to the frame.

Figure 2:
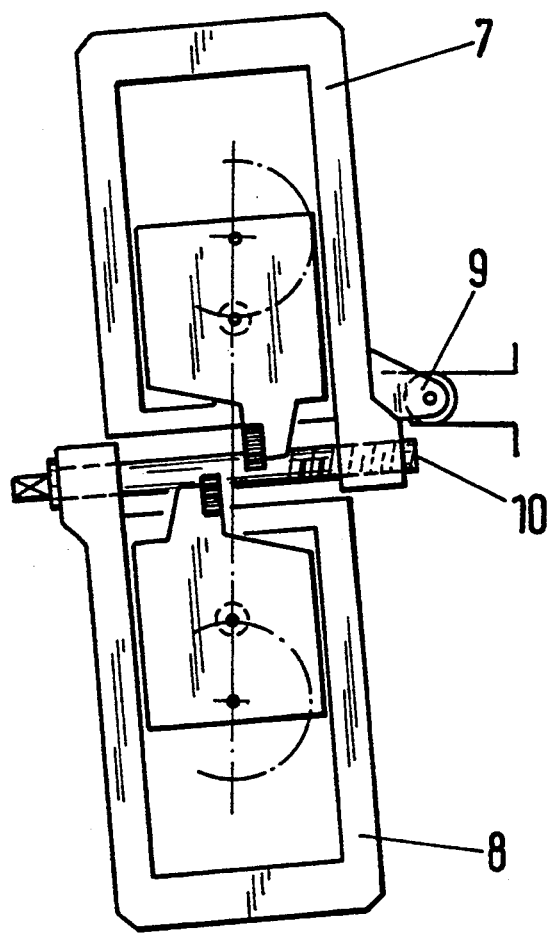
FIG. 2 shows the blade gap adjustment of the guillotine shear according to FIG. 1.

As can be seen in FIG. 2, the tipper and lower guide frame halves 7, 8 move in opposite directions when the screw spindle 10 is adjusted and are displaced in opposite directions relative to one another. Since the rotational axes of the crankshafts 2 and 3 do not change position because they are supported in the shear housing 1, the upper and lower guide frame halves execute swiveling movements around these rotational axes and tilt in an inclined position. In so doing, as can be seen in the drawing, the gap between the upper blade and lower blade changes without necessitating a change in the drive kinematics. The inclined position of the blades is unimportant in practice, since it represents tractions of millimeters, i.e. it is shown in exaggerated form in the drawing for the sake of clarity. The movements of the blade supports to the left and right are synchronous when the spindle is adjusted in a corresponding manner and can be adjusted very easily, e.g. when outfitted with electric adjusting drives, since they are not located on rotating parts.

The invention is not limited by the embodiments described above which are presented as examples only but can be modified in various ways within the scope of protection defined by the appended patent claims.

I claim:

1. A blade guide of a guillotine shear for flying transverse parting of a strip, the shear having a housing, said blade guide comprising: a guide frame arranged in the shear housing so as to be horizontally movable; blade supports rotatably arranged in the guide frame; crank mechanisms supported in the shear housing and associated with each blade support so as to rotate the blade supports; and blades fastened to the blade supports so as to be movable relative to one another on parallel guide paths for cutting and transversely to the guide paths in a running direction of the strip and at a running speed of the strip, the blades including an upper blade and a lower blade, the guide frame comprises a separate upper guide frame half and a separate lower guide frame half receiving the upper and the lower blade, respectively, the guide frame halves being connected with one another in a direction of the guide paths by a means for synchronously displacing the guide frame halves in opposed directions transverse to the guide paths.

2. The blade guide according to claim 1, wherein said for displacing the guide frame halves is a linear drive means.

3. The blade guide according to claim 2, wherein the drive means includes a spindle drive.

4. The blade guide according to claim 1, and further comprising guide means for supportably guiding at least one of the guide frame halves on the shear housing.

5. The blade guide according to claim 1, wherein the crank mechanisms each have a center of rotation, the guide frame being tillable when the guide frame halves are displaced in opposite directions relative to one another, and further comprising means for swiveling each guide frame half around the center of rotation of the crank mechanism associated therewith.

* * * * *